United States Patent
Kelpin

[15] 3,698,163
[45] Oct. 17, 1972

[54] AQUATIC HARVESTER

[72] Inventor: Thomas G. Kelpin, 8877 Boyonne Drive, Shreveport, La. 71108

[22] Filed: Dec. 14, 1970

[21] Appl. No.: 97,497

[52] U.S. Cl. .......................... 56/9, 114/66.5 F, 115/3
[51] Int. Cl. ............................................. A01d 45/08
[58] Field of Search ............ 56/8, 9, 296; 115/3, .5 R, 115/.5 A; 114/49, 53, 66.5 F

[56] References Cited

UNITED STATES PATENTS

| | | | |
|---|---|---|---|
| 1,481,177 | 1/1924 | Bayard et al. | 56/9 |
| 1,804,262 | 5/1931 | Lewis et al. | 115/.5 A |
| 1,842,125 | 1/1932 | Schwarz | 115/3 X |
| 3,286,447 | 11/1966 | Grinwald | 56/9 |
| 3,332,388 | 7/1967 | Moraski | 115/.5 A |
| 3,347,029 | 10/1967 | Grinwald | 56/9 |
| 3,449,892 | 6/1969 | Huff | 56/9 |
| 3,477,213 | 11/1969 | Just et al. | 56/9 |
| 3,577,716 | 5/1971 | McCarty et al. | 56/297 |
| 3,614,937 | 10/1971 | Schulman | 114/66.5 F |

FOREIGN PATENTS OR APPLICATIONS

| | | | |
|---|---|---|---|
| 450,788 | 4/1968 | Switzerland | 56/9 |

*Primary Examiner*—Russell R. Kinsey
*Attorney*—Stepno & Neilan

[57] ABSTRACT

An improved aquatic harvester is disclosed having an aquatic craft comprising a plurality of pontoons secured to a flat deck member, the craft being propelled and steered by a totally above-the-water air propulsion system. Other features include a self-unloading conveyor system, a heavy duty cutter bar assembly specially designed for cutting underwater weed growth, and a three-phase electrical power system to operate all subassemblies. The harvester is capable of carrying payloads in excess of 10 tons while at the same time having a draft of approximately 15 inches of water with no below-the-water drive or controls, thus rendering the craft free from fouling.

26 Claims, 16 Drawing Figures

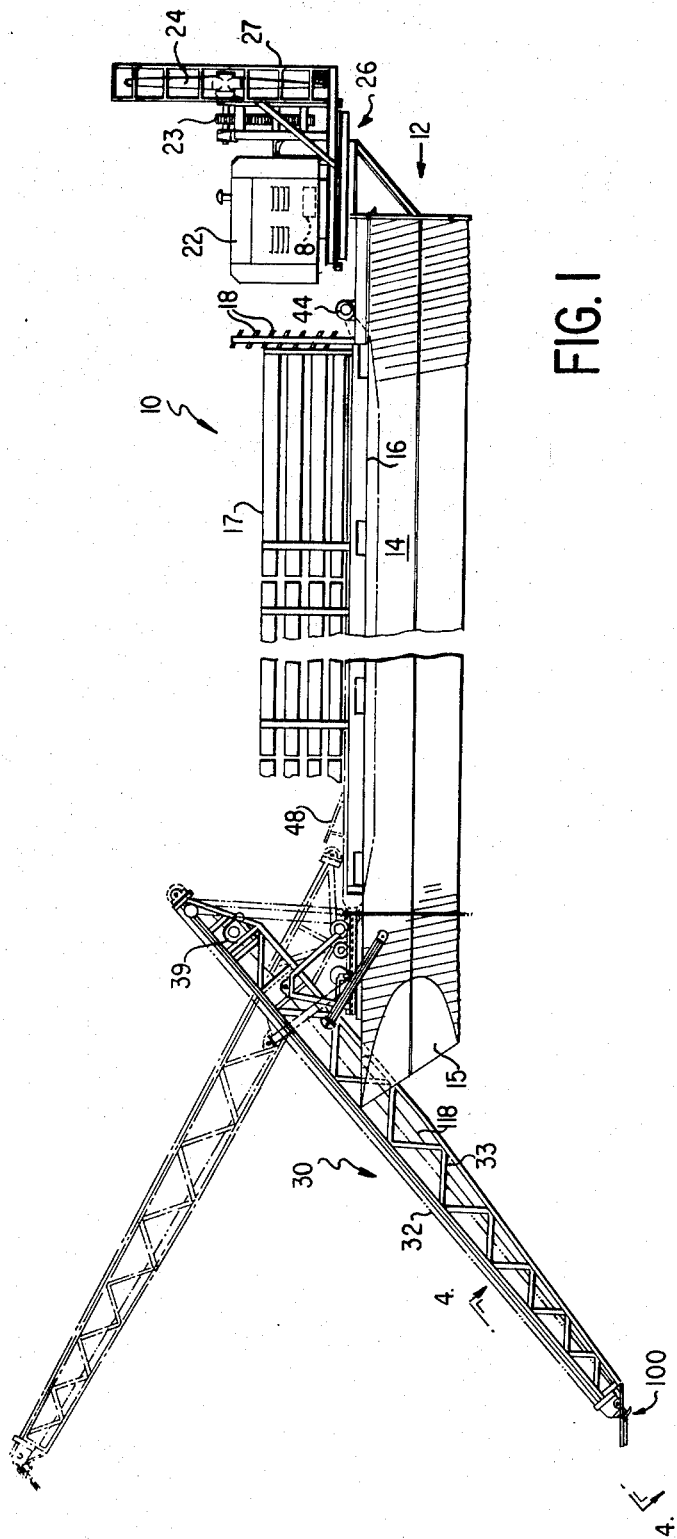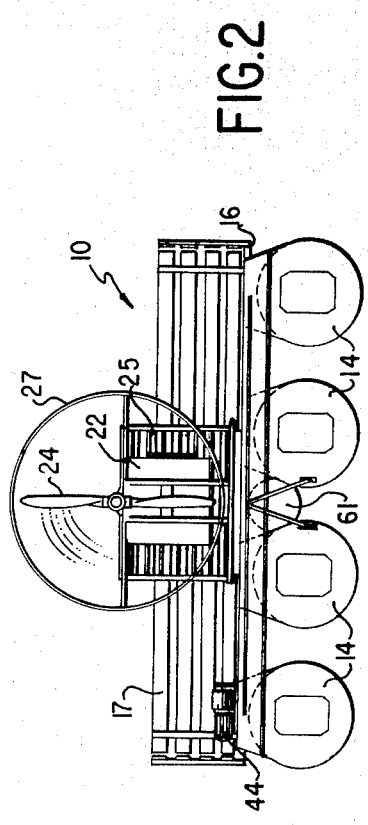

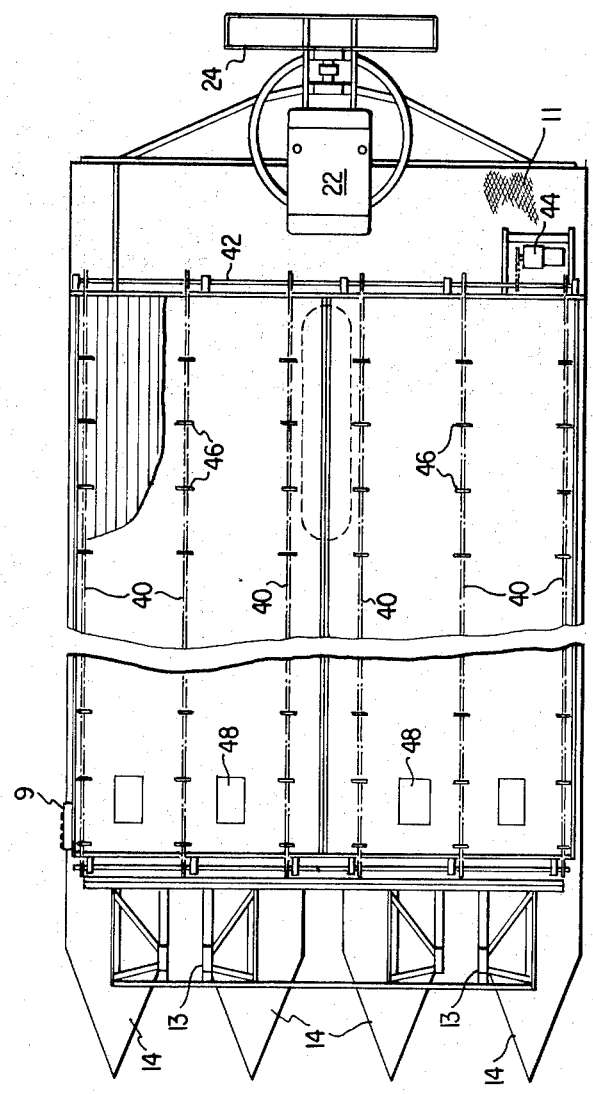
FIG.3
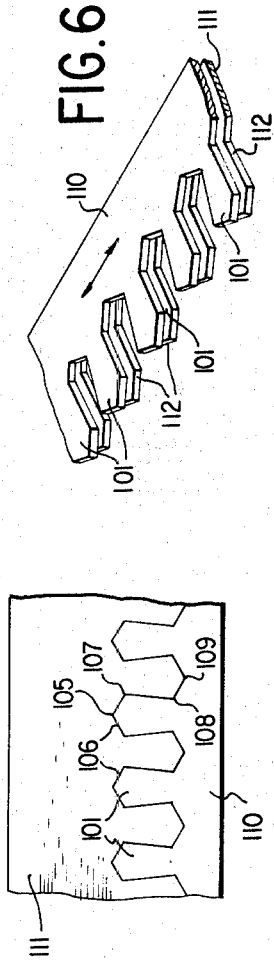
FIG.6
FIG.5
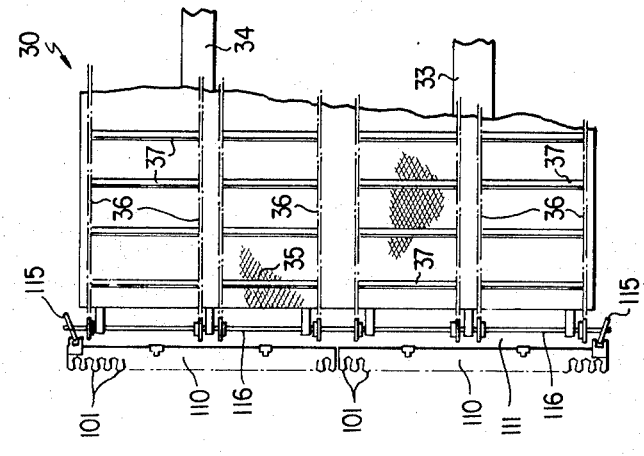
FIG.4

PATENTED OCT 17 1972

AQUATIC HARVESTER

BACKGROUND OF THE INVENTION

This invention relates to an apparatus for harvesting aquatic material, and more especially to an improved device for efficiently cutting and harvesting underwater marine plant life, primarily in inland lakes and waterways, and in coastal waterways.

Inland bodies of water, be they lakes, rivers, flowages, canals, etc., are all subject to the process of eutrophication, or in other words, natural aging. This phenomenon normally occurs over a period of many thousands of years, whereby a body of water passes through three more or less distinct stages of development.

In its early life a naturally formed lake or other such body of water is in what is known as the oligotrophic stage wherein the lake may be characterized as being deep, having steep walls and very clear water. The clearness of the water evidences a very low productivity, and plankton are very sparse. In addition, the body of water is characterized as having no shore vegetation, no bottom algae and very little sediment deposited on its bottom. In the second, or mesotrophic stage, a body of water gradually ages toward maturity. There now begins to accumulate substantial sediment, the rock walls become eroded and less steep, and likewise there appears some shore vegetation and bottom algae. Productivity in the water gradually increases throughout the mesotrophic stage and thus the nutrient content grows steadily higher. Entrance of the eutrophic stage is signaled when a body of water reaches senescence. In this last stage, the body of water is largely filled with silt and organic sediment with the shore lines taking on a gradual slope because of the accumulation of sediment. Extensive marshes appear around the periphery of the body of water together with large amounts of other shore vegetation. Algae covers most of the bottom, and the productivity of the water becomes very high. In the terminal period of this final stage, there occurs a filling of the body of water with gradual occupation of the area by terrestrial vegetation whereupon the former body of water reverts to the status of a marsh or a moor. Finally, all that may be left is a small central marsh with the remainder assuming the characteristic of a dry land forest.

Civilization has now become fully cognizant of the fact that it may be accelerating the natural phenomenon of eutrophication as much as 100 times its normal rate. Careless industrial waste treatment, inadequate septic systems, agricultural chemical runoff, and municipal sewerage treatment facilities inadequate to serve the growing urban populations have resulted in the discharge of large quantities of nitrogen and phosphorous containing chemicals into the inland waterways of the United States and other industrialized countries. The result has been an increase in the growth of aquatic plant life of such phenomenal proportions as to not only render many bodies of water unusable and/or unhealthy, but also to threaten the early demise of these valuable natural resources.

Recognition of the problem has brought forth many proposals, and has generated some action, e.g., removal of phosphates from detergents; however, it is apparent that even the current general awareness of the situation has not resulted in adequate precautionary steps in the various segments of the governmental-industrial community. Thus, it appears that any steps toward significant alleviation of the problem are at least as distant in the future as stringent legislation governing water pollution. In the meantime, in an attempt to maintain the status quo and possibly to reverse the already present trend, it will be necessary to deal with the problem in an after-the-fact manner, namely, killing and/or removal of the aquatic plant growth after its appearance in a body of water. Unfortunately, poisoning of aquatic plant growth by means of various herbicides and algacides, by far the most expeditious method both economically and application-wise, has proven to be an ecologically unsound and even detrimental means of dealing with the problem. Hence, it is now apparent that mechanical harvesting of underwater plant growth is the only truly, practical and efficacious means available at this time for retarding man's acceleration of the eutrophication process.

Apparatus for harvesting aquatic plant growth is known in the art and has likewise known many variations and adaptations to fit particular needs, e.g., ocean-going kelp harvesters, designs for inland waterways, etc. Heretofore proposed designs for apparatus adapted primarily for harvesting aquatic plant life in inland waterways have uniformly suffered from certain drawbacks and disadvantages. For example, because most are patterned on a basic barge design principle, their payload capacity has been severely limited inasmuch as increases in actual craft weight attendant with corresponding increases in craft size have resulted in harvesting apparatus which is rendered useless in many shallow lakes and shallow portions of lakes and rivers where the need for harvesting is most often the greatest. Moreover, the conventional use of hydraulic components to operate the various systems of heretofore known marine harvesting apparatus has also resulted in significant increases in overall harvester weight and corresponding decreases in payload capacity. Prior art harvesters are uniformly characterized by some form of below the water propulsion and steering, e.g., outboard motors, side or stern paddlewheels, rudders, etc. The use of below the water propulsion and/or steering systems has resulted in severe limitations upon maneuverability of the subject apparatus since such means are notably inefficient and susceptible to clogging and fouling when it is attempted to maneuver the harvester in areas of heavy aquatic plant growth where harvesting is being conducted, particularly in backing or turning of the harvester apparatus. Furthermore, typical prior art harvesters have little or no self-contained payload storage area, and consequently there is employed a plurality of crafts, e.g., the harvester and one or more intermediate barges or the like for handling the payload subsequent to cutting. As a result, it is necessary to either frequently unload the harvester and/or to handle the cut aquatic growth in one or more intermediate steps between harvesting and ultimate removal thereof from the harvesting site, these factors requiring in most instances the presence of an operating crew of three or more men.

In another aspect, difficulty has arisen in prior art harvester apparatus because the machinery was not capable of surviving collisions with hidden underwater objects often encountered in shallow areas of a body of water. Most notably, the standard cutter bars uniformly employed in virtually all types of harvesters become damaged, primarily through breakage of the removable teeth, upon even the slightest impact. Frequent replacement of cutter bars, and to an even greater extend, replacement of individual teeth upon a cutter bar, has resulted in a good deal of lost work time.

The totality of the foregoing disadvantages and restrictions has resulted in significant design limitations associated with aquatic harvesting apparatus manufactured in accordance with heretofore accepted principles. For example, because of related size and weight considerations the most successful inland waterway machines have been limited to cutting swaths of typically from 6 – 10 feet across, and similarly, a 3,000 pound harvester payload capacity is a common upper limit. Moreover, because of the complicated assemblage of equipment and hydraulic components, machines of the foregoing type are generally priced in the $30,000 to $50,000 range. These factors make it readily apparent that the prior art harvesters are rendered unsuitable from a harvesting capacity standpoint for communities faced with a formidable weedgrowth problem in one or more sizeable bodies of water, and likewise, that the same are unsuitable from an economical standpoint for smaller municipalities with limited financial resources.

SUMMARY OF THE INVENTION

Accordingly, it is a primary object of this invention to provide an aquatic weed harvester having an improved vehicle design allowing for enhanced maneuverability in shallow inland waterways as well as significantly increased payload capacity.

Another object of this invention is to provide an aquatic weed harvester having a completely above-the-water propulsion and steering system which facilitates operation and control of the apparatus and totally eliminates any underwater fouling of the propulsion system by aquatic plant growth.

Yet another object of this invention is to provide an aquatic weed harvester operable by a single individual in every aspect, including cutting and harvesting of the aquatic plant growth, stowage of the harvested payload upon the harvester deck and finally, direct delivery of the payload from the harvester to a road vehicle.

Another object of the invention is the provision of an aquatic weed harvester wherein the operational control system for the harvester subcomponent systems is characterized as being simple, lightweight and inexpensive.

It is another object of the invention to provide an aquatic weed harvester having an underwater assemblage, particularly the cutter bar, which is extremely strong and versatile and can withstand without damage impact with virtually any object likely to be encountered beneath the surface of the water.

Still another object of this invention, cumulative with the foregoing objects, is the production of an aquatic weed harvester having vastly increased cutting and payload capacities, and yet one which is economically within reach of most communities.

Thus, in accomplishing the foregoing objectives, there is provided an aquatic harvester comprising an aquatic craft having a plurality of pontoon members secured beneath a flat deck member, the harvester being additionally characterized by a completely above-the-water propulsion and steering system comprised of an air propulsion unit and a mounting means for the air propulsion unit capable of rotating 360° about a vertical axis. Pontoon members of a special nature are employed in the present design, namely, those constructed of corrugated metal wall conduits of the spirally or helically wound type, more specifically, those having folded and crimped seams along the spiral lines of construction. The propulsion and steering system is unique in that it comprises an air propulsion unit, including an engine and aerodynamic propeller, employed in conjunction with a mounting means comprising a first horizontally disposed annular member secured to the aquatic craft adjacent the aft portion thereof, a second annular member concentrically superimposed upon the first annular member, with the second member being radially immovable with respect to the first member and circumferentially rotatable about a common vertical axis therewith. Engine mounting means are secured to the second annular member, and a control system is provided to selectively rotate the second annular member through an arc of 360° to achieve complete above-the-water propulsion and steering control of the harvesting apparatus.

As with other aquatic harvesting apparatus of the present type, the instant apparatus includes a pick-up assembly for aquatic material located both at and below the surface of the water, this assembly comprising, primarily, a means for conveying the aquatic material out of the water, and onto the deck of the aquatic craft. Other features employed in conjunction with the aquatic material handling systems of the present harvester include a bed conveyor means overlying the deck member of the aquatic craft. This conveyor means is selectively operable to convey in both the fore and aft directions to position harvested aquatic matter along the deck. Preferably, the harvester contains a mounting means pivotally connecting the pick-up assembly to the aquatic craft so that the assembly projects forward of the craft and also is rotatable about a horizontal axis. In conjunction therewith, there is provided an actuating means for rotating the pick-up assembly to vary the elevation of the forward end thereof and likewise, to hold the assembly at any selected elevation. Complementing the immediately foregoing structure, there is also incorporated a conveyor means in the pick-up assembly which is operable to convey in both the fore and aft directions, whereby the pick-up assembly serves also as an unloading means when the aft end of the pick-up assembly conveyor is rotated to a position contiguous with the bed conveyor means.

Another important feature of the present invention resides in the exclusive use of electrical energy to operate the various harvester systems. This is accomplished primarily by providing a 230 volt three phase electric power generator operably connected to the crankshaft of the propulsion unit engine. Thus, from this source of electrical energy, there are operated three reversible 230 volt electric motors which serve as the driving means for the pick-up conveyor means, the bed conveyor means and the actuating means for the pick-up assembly.

Typically, although not necessarily, harvesting apparatus of the present type includes a horizontal cutter means located adjacent the forward edge of the pick-up assembly. In the present harvester, there is provided a particularly economical, effective and structurally superior cutter means comprising a first and second cutter bar presenting a series of integral, spaced teeth, the teeth of the first bar being in overlying shearing cooperation with the teeth of the second bar, and the teeth of both bars having blunt pointed tips with side portions rearwardly and outwardly diverging therefrom to an intermediate location, the side portions thereafter converging inwardly and rearwardly to a second intermediate point, and thence the side portions again diverging outwardly and rearwardly to the midpoint intermediate adjacent teeth, the divergence being at an angle preferably equal to the first angle of divergence at the tip of the blade. The converging and second diverging side portions thus form a re-entrant configuration between adjacent teeth. In the preferred embodiment, the second cutter bar is mounted stationary upon a pick-up assembly and the first cutter bar is divided into two equal sections which are then reciprocated 180° out of phase with one another by mechanical operating means drivable from the pick-up conveyor. The foregoing preferred cutter bar tooth configuration lends yet another important advantage, namely, that the first and second cutter bars may be manufactured from a single rectangular sheet of metal, with a single cutting operation, since one cutter bar is defined by the exact residue resulting from cutting the other bar from the metal sheet.

Other objects and the nature and the advantages of the instant invention will be apparent from the description hereinbelow, taken in conjunction with the accompanying drawings wherein like reference numerals are used to indicate like or equivalent parts.

BRIEF DESCRIPTION OF THE DRAWINGS

FIG. 1 is a side view, partially cut away, of an aquatic harvester according to the invention, illustrating in phantom lines the unloading position for the pick-up assembly;

FIG. 2 is a right side view of FIG. 1;

FIG. 3 is a top view of the aquatic craft portion of an aquatic harvester according to this invention;

FIG. 4 is a view taken along the line 4—4 of FIG. 1;

FIG. 5 illustrates the configuration of a section of the preferred cutter bars manufactured in accordance with the present invention;

FIG. 6 is a perspective view of the preferred cutter bars in overlying shearing cooperation;

DETAILED DESCRIPTION OF THE INVENTION

Figure 7:
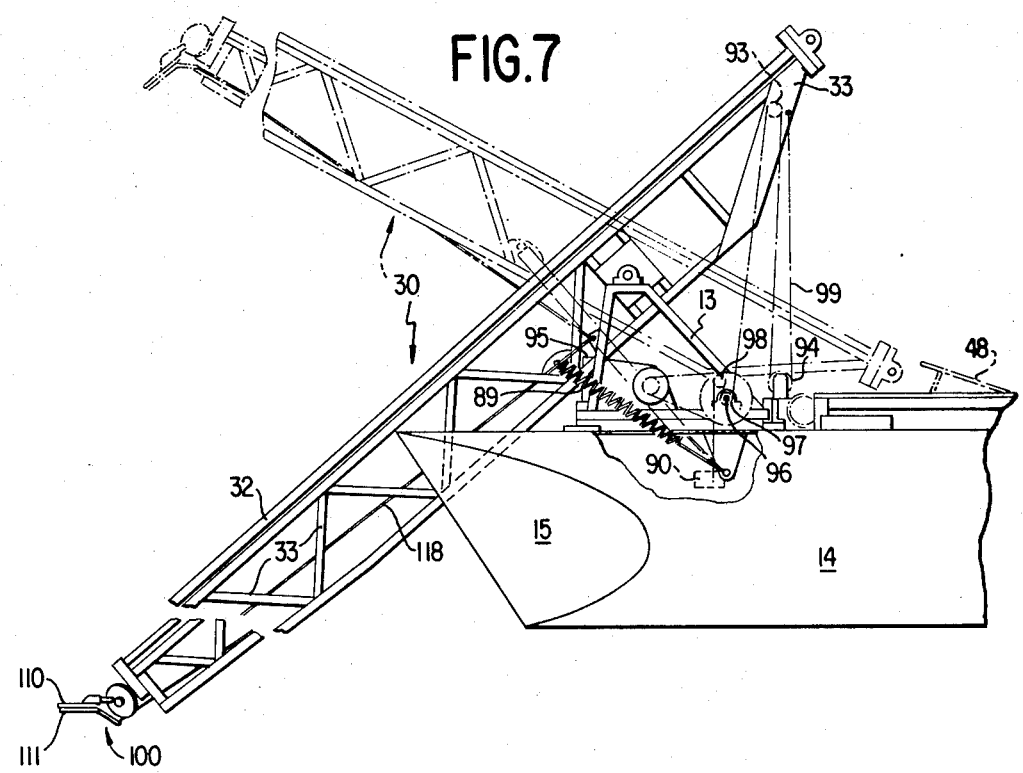
FIG. 7 is a detailed view, partially in section, illustrating the actuator means for the pick-up assembly, with the unloading position of the assembly illustrated in phantom lines.

Referring now to the drawings, and particularly to FIGS. 1 and 2, there is designated generally by reference numeral 10 an aquatic harvester in accordance with the present invention. The basic harvester component is the aquatic craft, designated generally by reference numeral 12, comprising a plurality of pontoon members 14 secured beneath a flat deck member 16. The aquatic craft is driven and steered by a completely above-the-water system comprising an air propulsion unit having an engine 22 and an aerodynamic propeller 24, this unit being secured to a mounting means 26 which is controllably rotatable 360° about a vertical axis. At the forward end of the harvester there is mounted a pick-up assembly 30 which contains a conveyor 32 for picking up aquatic material both at and below the surface of the water and conveying the same onto the deck 16 of aquatic craft 12. As illustrated in FIG. 1, the pick-up assembly may be rotated to an elevated position wherein it serves as an unloading means when the conveyor 32 is operated in the reverse, or forward direction. In a preferred embodiment, the harvester apparatus has a horizontal cutter bar assembly 100 located adjacent the forward edge of the pick-up assembly. Most preferably, the cutter bar assembly is operated through direct mechanical linkage with the pick-up conveyor 32.

While the foregoing has briefly set forth and described the basic components of the illustrated embodiment of the present aquatic harvester, each of the said components will hereinafter be further described in detail.

THE AQUATIC CRAFT

The aquatic craft comprises four pontoon members 14 secured beneath a flat deck 16 fabricated from wooden tongue in groove boards. Each pontoon is constructed from a single continuous metal conduit and contains at its forward edge bevelled portions 15 defining a tapered or pointed configuration to aid movement of the craft through the water. The payload containing section on the flat deck 16 is defined by the aforesaid portion constructed of wooden flooring material, that portion being confined on three sides by upstanding side rail members 17. The railing immediately forward of the air propulsion system is further provided with upwardly directed louvers 18 which serve to deflect the air thrust away from the vehicle when the propulsion system is in the reversed position. Aft of the payload containing portion of the deck is located an auxilliary deck area 11 fabricated from a light weight metallic mesh material as shown in FIG. 3. Forward of the payload deck area there is secured to the aquatic craft a support frame 13 for the pick-up assembly 30. Beneath the deck 16 and between pontoons there is provided a suitable fuel tank 61.

Overlying the deck member 16 is a bed conveyor comprising laterally spaced endless conveyor chains 40 driven by common line shaft 42. Line shaft 42 in turn is driven by a reversible 1½ horsepower 230 volt three-phase electric motor 44, and thus, the bed conveyor is operable to convey in both the fore and aft directions. The endless bed conveyor chains also contain a series of upstanding teeth 46 spaced at intervals along the length of each chain 40 to assist in the movement of aquatic material contained on the deck of the craft during harvesting operations. Also located near the forward end of the bed conveyor are a series of spaced deck risers 48 which are mechanically actuated into the rearwardly inclined position illustrated in FIGS. 1 and 7 to assist in transferring harvested aquatic material from the bed conveyor to the pick-up conveyor when the machine is performing its unloading function. Raising of the pick-up assembly to its unloading position mechanically positions the deck risers 48 into the inclined position through a suitable linkage assembly.

Figure 9:
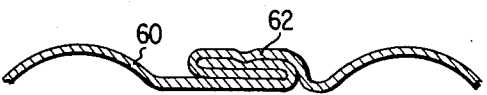
FIG. 9 illustrates the cross section of a pontoon wall showing the structure of a folded and crimped seam.
Figure 10:
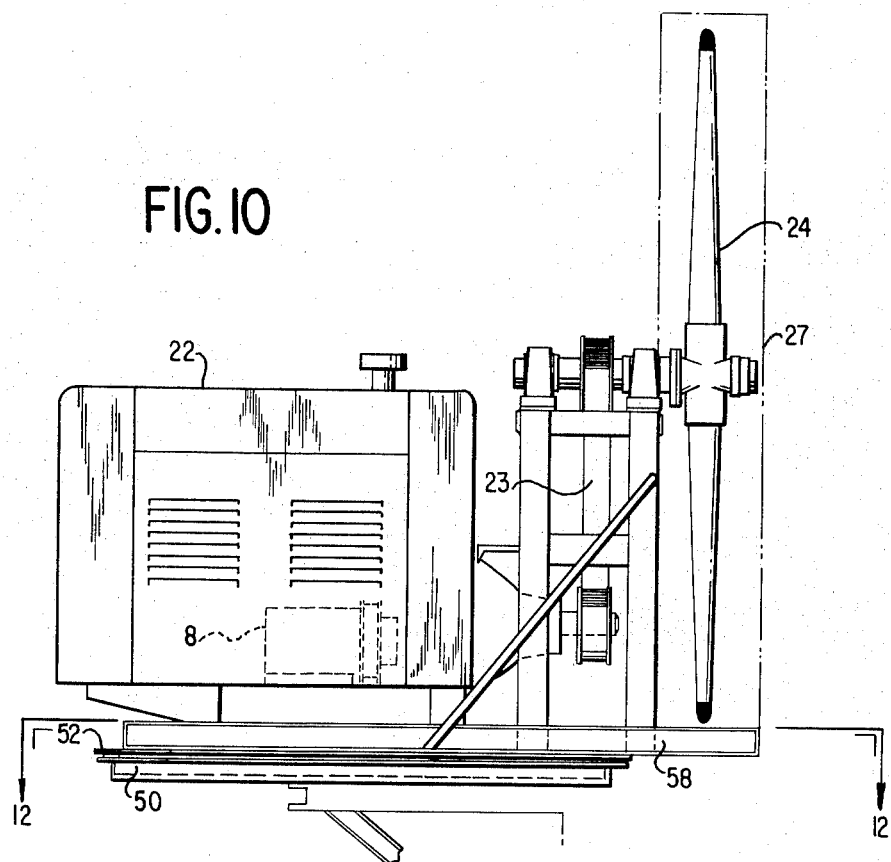
FIG. 10 is a detailed side view of the engine and air propeller assembly.
Figure 11:
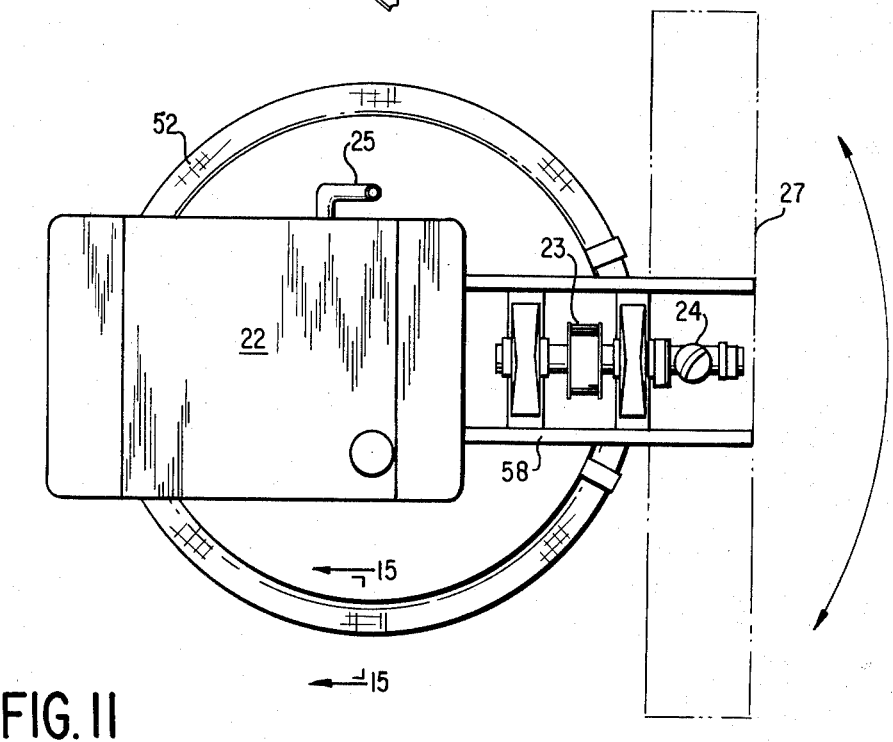
FIG. 11 is a top view of FIG. 10.
Figure 12:
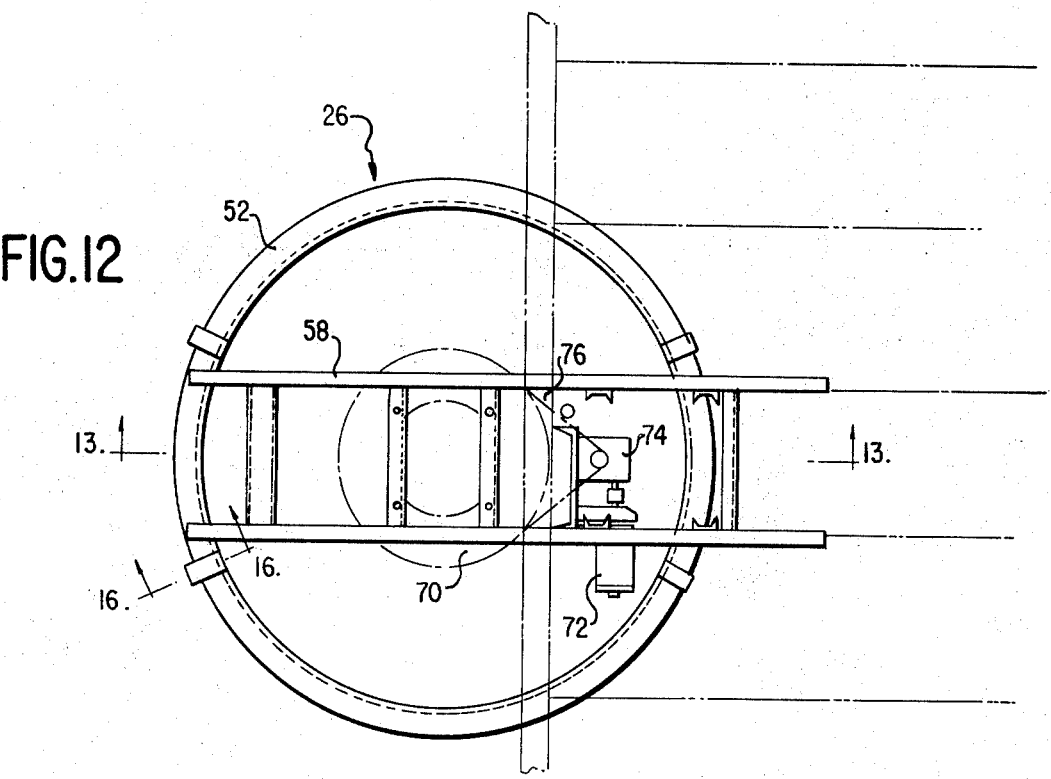
FIG. 12 is a view along the line 12—12 in FIG. 10, illustrating the steering control assembly.
Figure 13:
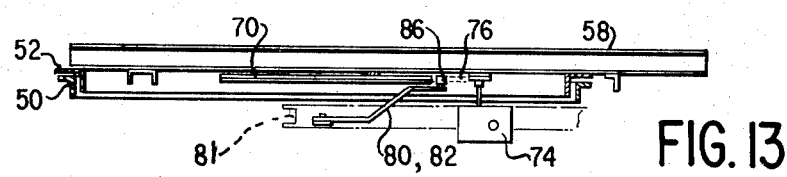
FIG. 13 is a view along the line 13—13 of FIG. 12.

Since the weight of the total harvester apparatus is of critical importance as regards the achievement of significant payload capacity, it is of utmost importance to construct the aquatic craft from material and components which combine the necessary factors of strength and durability with the minimum amount of weight. Thus, there has been employed the aforementioned wooden deck material in the payload containing area, the light weight mesh material on the remaining portions of the deck and the basic pontoon design in contradistinction to prior art barge-type designs. Moreover, the pontoon design has exhibited greatly decreased resistance to passage through the water, particularly when employed with the complementary above-the-water propulsion system of the present invention. However, perhaps the most salient feature of the present aquatic craft design resides in the combination of performance characteristics and economy afforded by the use of a particularly preferred pontoon member. Specifically, pontoon members have been fabricated from a specific type of corrugated pipe which is characterized by the conventional spirally wound configuration, but in contradistinction to conventional riveted or folded-seam pipe, the instant pipe is further characterized by a special air-tight folded and crimped seam. In FIG. 9 there is illustrated a cross section of the subject pipe wall 60 showing in detail the configuration of a folded and crimped seam 62. Apparatus suitable for fabricating spirally wound conduits having folded and crimped seams of the type illustrated in FIG. 9 are described in U.S. Pat. No. 3,132,616. It has been established by static hydraulic pressure tests conducted on the subject conduits by the Pittsburgh Testing Laboratories that the folded and crimped seams will withstand at least about 28 p.s.i. before failing. Thus, there is obtained from these conduits a pontoon which is extremely flexible because of the spiral construction, relatively inexpensive and easily obtainable, sufficiently light weight, yet suitably strong to support the weight of the machinery and the increased payloads obtainable therewith. In fact, it has been found that a pontoon of the foregoing type having an overall length of 46 feet and a diameter of 36 inches constructed of 14 gauge steel material has a weight of only 1,355 pounds, whereas the same is capable of supporting 20,000 pounds of flotation weight. It is therefore readily apparent that the illustrated embodiment of this invention is easily capable of carrying a 20,000 pound payload of harvested aquatic material. Furthermore, it was discovered quite unexpectedly that an increase in the degree of corrugation of the pontoon members results in a decrease in the drag resistance of the member as it is pushed through the water. Consequently, it is preferred to employ corrugated conduit having a maximum degree of corrugation, typically from about one-half to about three-fourths inch from peak to depression.

It will of course be appreciated that other types of spirally wound conduit having equivalent seams may be satisfactorily employed to fabricate pontoons for the instant harvester apparatus. However, to meet the minimum requirements therefore, the seams must be air tight and capable of withstanding a static pressure of at least about 10 p.s.i., and preferably 28 p.s.i., before failure.

THE PROPULSION AND STEERING SYSTEM

Air propulsion systems are certainly well known and have even been employed in conjunction with certain types of harvesting apparatus (see for example, Swiss Pat. No. 450,788). However, in most types of known air propulsion systems steering is accomplished by one or more rudders coacting with the air, or in the case of aquatic vehicles, rudders coacting with the water to provide an improved degree of control as compared to a system where only an air-disposed rudder is employed. As noted, air actuated steering vanes or rudders are highly inefficient, and likewise, provision of a below-the-water rudder in an aquatic craft to a large degree defeats the purpose of providing above-the-water propulsion. For example, in the hereinabove mentioned Swiss patent a complex system of adjustable rudders or vanes are built into the hood assembly surrounding the propeller. It will be noted though, that even in the preferred embodiments of the patent, the illustrated below-the-water rudders must necessarily be employed in reversing the vehicle. In another embodiment of the subject patent, the vehicle is provided with a barge-type supporting structure and the propulsion system may be rotated 30° either direction to aid in steering; however, in addition to the two types of aforementioned rudders, such a modification further necessitates the addition of a stabilizing member at the bow of the craft.

Similarly, steering control for air propelled vehicles has been achieved by providing a means to horizontally rotate the propulsion source, namely, the propeller, about an arc of 360°; however, designs of this type have almost exclusively been limited to instances where small craft are sought to be propelled since prior art rotational means generally embody a single vertical post or shaft as the sole support means and axis of rotation. There is not known in the art a suitable mounting means for a heavy duty engine and attached propeller which allows for remote control rotation of the entire propulsion unit through an arc of 360° about a vertical axis to achieve complete directional control of the particular vehicle in the absence of auxilliary rudders, vanes and/or stabilizing members. In fact, it has generally been thought that significant torque and vibrational problems would prohibit the successful use of such a system.

The propulsion and steering system of the present invention is illustrated in FIGS. 10 through 16. The basic propulsion unit consists of an engine 22 preferably of the internal combustion type, but of a non-polluting nature, such as a 391 cubic inch V-8 Ford industrial type engine adapted for a vapor fuel such as propane. The engine is operably connected through flexible belt 23 to the aerodynamic propeller 24. Contained internally of the engine 22 is a transmission which is operable by means of lever 25 to engage and disengage the power supply to belt 23 and hence to propeller 24. For safety reasons, there is provided a cage type protector 27 around the propeller.

The propulsion system mounting assembly 26, illustrated in detail in FIGS. 12 through 16, also serves as the steering assembly for the aquatic craft. This assembly comprises a pair of superimposed annular members, consisting of a first annular member 50 and a second annular member 52 each fabricated from angle iron in the illustrated embodiment. The first annular member 50 is rigidly secured adjacent the aft end of the aquatic craft by suitable support members, whereas the second annular member 52 is of slightly smaller diameter than the first annulus, and hence, when concentrically superimposed thereon rests inside the first annular member and is confined thereby so as to be radially immovable with respect thereto. See FIGS. 15 and 16. However, because annulus 52 is freely resting upon annulus 50, the former is freely rotatable through an angle of 360° about the common vertical axis of the annuli. The two annular members are of sufficient diameter to underlie a substantial portion of the propulsion unit in order to provide adequate support and stability therefor. Typically, there is provided bearing members between the two annular members to facilitate rotational movement therebetween. Identified by reference numeral 54 in FIG. 15, such bearing members are preferably fabricated of fiberglass or other synthetic resin laminated or bonded material to serve additionally as vibrating and shock absorbing members. These bearing members may also be channeled and provided with grease fittings to further enhance their utility as bearings. To the upper surface of the second annular member 52 there is secured mounting means in the form of framework 58 for the engine and air propulsion unit.

There is also provided novel rotational means for the steering assembly comprising annular sprocket 70 secured to the second annular member 52 through the engine mounting structure 58. Sprockets 70, and hence the steering assembly, are driven selectively in either the clockwise or counter clockwise direction by reversible electric motor 72 acting through a suitable gear reducer 74 and roller chain 76. Reversible electric motor 72 is a 12 volt DC motor supplied with electrical energy from the ignition system of engine 22. This rotational means provides a steering system which is simple, dependable and practically fail safe, and one which can easily and inexpensively operate from a remote position through simple electrical control circuitry. Thus, at all times when the engine is running, and even when the ignition is merely in the "on" position, complete control is achieved over rotation of the air propulsion unit. The aforementioned remote control system is preferably one wherein rotation is initiated by simple selection and depression of either a clockwise or a counter clockwise rotation button or switch. Rotation proceeds only when the switch or button is held in the on position by the operator. However, to further assist the operator, the rotation system may additionally be provided with "cut-off" switches at the 90° positions about the annular members 50 and 52, whereby rotation will automatically stop as the propulsion unit is rotated past any one of the four points regardless of whether the operator continues to hold the control switch in the "on" position.

Figure 14:
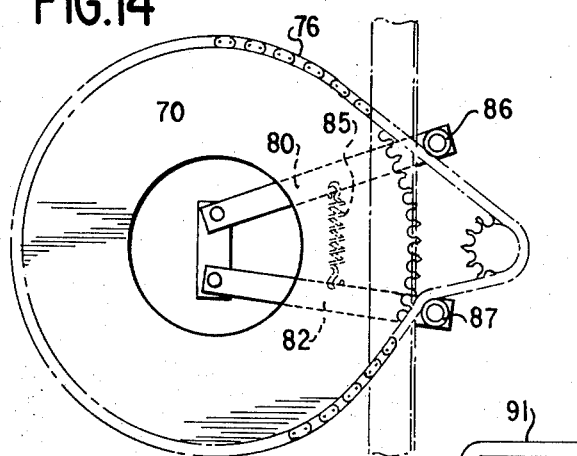
FIG. 14 is a top view of a chain tightener employed in conjunction with the steering control assembly.
Figure 15:
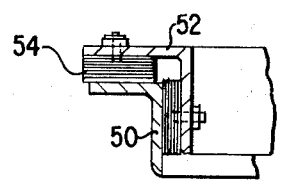
FIG. 15 is a view taken along the line 15—15 of FIG. 11.

In FIG. 14 there is illustrated a typical chain tightener assembly adapted to take up the slack when sprocket 70 and roller chain 76 are rotated in either the clockwise or counter clockwise direction. The chain tightener system comprises two stationary bars 80 and 82 secured to stationary annular member 50 through structural support member 81, said bar members 80 and 82 being biased towards one another by spring 85. This biasing action forces cam rollers 86 and 87 mounted at the end of the two bar members, 80 and 82 respectively, against roller chain 76. Hence, as illustrated in FIG. 14, when sprocket 70 is rotated in the clockwise direction chain slack is taken up by roller 87.

Figure 16:
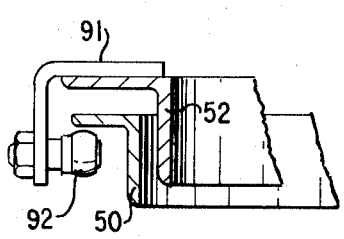
FIG. 16 is a view taken along the line 16—16 of FIG. 12.

In FIG. 16 there is illustrated a feature which can be optionally incorporated into the steering assembly. This feature consists of an angular bracket 91 secured to the second annular member 52, said bracket depending outwardly and downwardly therefrom to a point below the horizontal flange of first annular member 50. A bearing roller is then disposed inwardly from the downwardly depending section of bracket 91 passing beneath the horizontal flange of annulus 50 to provide a safety feature preventing accidental disengagement of annular members 50 and 52.

THE PICK-UP ASSEMBLY

Referring now to FIGS. 1, 4, 7 and 8 wherein there is illustrated the pick-up assembly designated generally by reference numeral 30, it is seen that this assembly comprises a pair of laterally spaced truss members 33 and 34 rotatably mounted near the upper or aft ends thereof to support frame 13 secured to the aquatic craft 12. Overlying the two truss members 33 and 34 and extending the full width of the aquatic craft 12 is a continuous mesh surface 35 supported by suitable reinforcing means. Previously mentioned pick-up conveyor 32 in turn overlies the mesh surface of the pick-up assembly. This conveyor consists of a series of pairs of endless conveyor chains 36, the chains of each pair being interconnected by lateral members 37 at spaced intervals along their lengths. It is preferred that at least a portion of each lateral connector 37 extend upwardly from the plane defined by the conveyor chains 36. Like the bed conveyor means on the deck member 16, the pick-up conveyor is selectively operable to convey in both the fore and aft directions, and like the bed conveyor, it is driven by a reversible three-phase 230 volt electric motor 39 located adjacent the aft portion of the pick-up assembly.

As illustrated in FIGS. 1 and 7, the pick-up assembly 30 may be rotated about the horizontal axis defined by its mounting points on support member 13. Thus, the forward end of the pick-up assembly may be positioned at elevations below the surface of the water or above the deck of the aquatic vehicle, or held at any elevation therebetween. The uppermost position of the pick-up assembly defines the unloading position wherein the aft end of the pick-up conveyor is rotated to a position contiguous with the bed conveyor. In this position, both the pick-up and bed conveyors may be operated to convey in the forward direction whereupon the payload of harvested aquatic material will be automatically unloaded from the deck of the aquatic craft.

Figure 8:
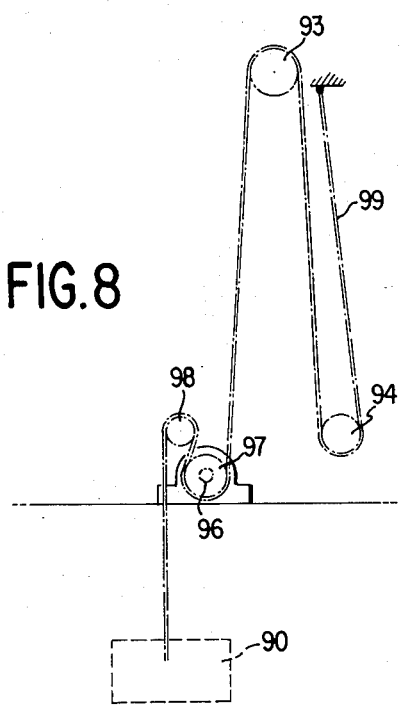
FIG. 8 is a skeleton view of FIG. 7 illustrating the path of the actuator chain.

The assembly employed to rotate the pick-up assembly about the aforementioned horizontal axis is illustrated in detail in FIGS. 7 and 8. Referred to herein as the actuator assembly, it comprises a basic power source consisting of a 1 horsepower 230 volt three-phase reversible electric motor 95 which in turn operates a line shaft 96 through a suitable chain and sprocket assembly. The line shaft carries a sprocket 97 beneath truss members 33 and 34 underlying each side of the pick-up assembly. A finite length of roller chain is secured to truss member 33 adjacent the aft end thereof, said roller chain then extending downwardly and around idler sprocket 94 mounted on the aquatic craft, and thence back up and around idler sprocket 93 secured on the pick-up assembly truss member. After passing over idler sprocket 93, roller chain 99 again passes down and around drive sprocket 97 secured on the line shaft 96. Roller chain 99 is caused to pass around the major portion of the circumference of sprocket 97 by passing the same around another idler sprocket 98 mounted adjacent and immediately above the drive sprocket 97, whereupon there is provided absolute engagement of the roller chain 99 about the drive sprocket to accurately control the degree of rotation of the pick-up assembly. The foregoing roller chain assembly is duplicated identically beneath the second pick-up assembly truss member 34 and thus the delineated structure serves the important purpose of assuring uniform rotational adjustment across the entire length of the pick-up assembly. Such uniform adjustment is difficultly attained with similar winch assemblies. The free end of roller chain 99, as it drops off idler sprocket 98, is collected into a suitable receptacle 90 positioned between the pontoon members 14. Likewise positioned therebetween, is a spring assist member 89 to counter-balance the weight of the pick-up assembly and aid in the rotation thereof. Again, identical spring assist members are provided beneath each of the truss members 33 and 34.

THREE-PHASE 230 VOLT ELECTRICAL SYSTEM

The complex hydraulic system utilized in prior art harvester apparatus to operate each of the various sub-assemblies suffers from several very serious drawbacks, namely, that the same are relatively expensive and that use thereof creates a serious gross weight problem as regards the resultant harvesting apparatus. Consequently, the maximum payload capacity of such apparatus is significantly limited, see for example, U.S. Pat. No. 3,286,447 and No. 3,477,213. Both of these problems have been overcome in the present aquatic harvester by employment of a three-phase 230 volt electrical power system from which corresponding electrical motors are supplied to drive the various sub-assembly systems of the instant aquatic harvester, viz., the pick-up assembly conveyor, the bed conveyor and pick-up assembly rotating or actuating means. Electrical power for this system is achieved by means of a three-phase alternator 8 driven by a crankshaft of engine 22. In addition to providing a safe, simple, economical and light weight power system for the various harvester sub-components, the present three-phase power system enables the concentration of all necessary remote control apparatus in a single control box designated by reference numeral 9 in FIG. 3. Moreover, such a control panel may either be mounted permanently at a fixed control station near the forward end of the aquatic craft, or preferably may be of a portable nature allowing the operator to carry the same to any desired location on the apparatus during operation while still enabling him to maintain complete control over the apparatus and its sub-components.

In a preferred embodiment of the invention, each of the aforementioned three-phase electric motors is provided with a 24 volt contactor, and correspondingly, a portion of the 230 V output of alternator 8 is stepped-down to 24 volts by means of an appropriate transformer. This stepped-down output is then used to operate the remote control system via control panel 9. In this manner, the operator is never exposed to contact with the 230 volt system, but contrariwise, only to the 24 volt control system.

In all other respects the electrical remote control systems employed are of a standard nature and are well known to those of ordinary skill in the electrical control art. Thus, the same need no detailed explanation here; however, it might be pointed out that in the preferred embodiment of the present aquatic harvester, it is desired that the bed conveyor and the pick-up assembly actuator means be operable on a demand basis only, i.e., that they operate only when the control button or switch is held in the "on" position by the operator. On the other hand, it is preferred that the pick-up assembly conveyor be operable on a constant "on-off" basis. It will of course be understood that the rotation or drive means for the steering system described hereinabove may also be operated from the three-phase 230 volt system by substituting the 12 volt motor with a suitable 230 volt three-phase model.

In a preferred embodiment, the three-phase alternator 8 is operably connected to the crankshaft of engine 22 through a device which transforms uneven rotational input from the crankshaft into a constant rotational output supplied to the alternator. Thus, a constant 36,000 rpm input to the alternator is assured irrespective of the speed at which the engine is being operated. Such a device operates on conventional variable speed transmission principles which are well understood by those of ordinary skill in the art and need no further development here.

Alternatively, the engine may be operated at a constant speed, with craft speed controlled through the use of a variable pitch propeller.

THE CUTTER BAR SYSTEM

It will be appreciated that the aquatic harvester of the present invention finds many applications not requiring the presence of a cutting means, e.g., picking up floating aquatic weed growth both at and below the surface of the water, picking up floating debris from the water, picking up objects off the bottom of a body of water, etc. However, when it is desired to include a cutting means adjacent the forward edge of the pick up assembly, it will be likewise appreciated that any of the conventional types of cutter bar designs may be employed for this purpose. But, as pointed out hereinabove, conventional cutter bar designs suffer from the serious disadvantage that they are easily damaged upon collision with objects hidden below the surface of the water, such objects often being encountered during weed harvesting operations.

In view of the foregoing, there has been provided according to the invention a cutter bar design and assembly of general utility, but primarily designed for cutting aquatic weed growth and withstanding the most vigorous abuse attendant therewith.

In FIGS. 1 and 7 there is generally illustrated a cutter bar mechanism 100 located adjacent the forward edge of the pick-up assembly 30, whereas the details of said cutter bar mechanism are illustrated in FIGS. 4, 5 and 6.

The individual cutter bars are characterized as having a series of integral, spaced teeth 101, (referring to bar 110 in FIG. 5) each tooth having a blunt pointed tip 105 with side portions 106 rearwardly and outwardly diverging therefrom to an intermediate point 107, the side portions thereafter converging inwardly and rearwardly to a second intermediate point 108, and thence the side portions again diverging outwardly and rearwardly to a point 109 centrally located between adjacent teeth, the second divergence preferably being at an angle equal to the first divergence at the tip of the blade. Thus, the converging side portion between points 107 and 108 and the second diverging side portion between points 108 and 109 form a re-entrant configuration between adjacent teeth.

The cutter bar mechanism 100 consists of a first cutter bar 110 and a second cutter bar 111, both presenting a series of integral, spaced teeth as set forth hereinabove. The teeth of the first cutter bar 110 are in overlying shearing cooperation with the teeth of the second bar 111, and preferably, the teeth of bar 110 are slightly forward of those on bar 111, as shown in FIG. 6. Strength is afforded to the cutter bars by fabricating the same from steel sheet stock preferably having a thickness of at least about five-sixteenths inch. Typically, however, cutter bars from about one-fourth to one-half inch in thickness afford the desired degree of strength. Moreover, because of the aforedescribed reentrant configurations existing between adjacent cutting teeth, weed growth becomes trapped and sheared off between overlying cooperating reciprocating cutter bar teeth without the necessity of providing bevelled or serrated sharpened edge portions on the cutter bar teeth. Hence, the edge portions 112 of teeth 101 may comprise essentially flat surfaces extending perpendicular to the plate of the cutter bar. Thus also, additional strength is afforded the subject cutter bars by such a design.

The immediately foregoing feature providing for the flat edge portions on the subject cutter bar teeth, coupled with the specific design of the cutter bar teeth, enables the highly advantageous result that the first and second cutter bars 110 and 111 may be manufactured from a single rectangular sheet of metal, with a single cutting operation since one cutter bar will be defined by the exact metal sheet residue resulting from the cut shape of the other cutter bar. This relationship is illustrated in FIG. 5 of the drawings. Thus, a single pass of a cutting tool, such as a cutting torch, produces a set of cutter bars suitable for use without further modification.

As illustrated in FIG. 4, the second or lower cutter bar 111 is mounted stationary upon the pick-up assembly 30 of the aquatic harvester. The first or upper cutter bar 110 is severed at its mid-point into two sections of equal length and each section is positioned in lateral sliding relationship with stationary cutter bar 111. The two sections of upper cutter bar 110 are then provided with mechanical driving means in the form of cammed disks 115 connected to common line shaft 116 carrying the pick-up apparatus conveyor chains. Rotation of shaft 116 and concomitant rotation of cammed disks 115 results in reciprocation of the two sections of top cutter bar 110. It is observed that the two cutter bar sections are timed to reciprocate 180° out of phase with one another, whereupon there is provided a highly effective means of cancelling out substantially all vibration resulting from reciprocation of the cutter bar mechanism. The foregoing design has significant advantages over certain prior art designs which require opposing reciprocation of two cutter bar members extending across the complete width of the cutter swath, such designs necessarily resulting in the development of more vibrational forces because of the movement of greater masses of material and because of the greater amount of energy expended therefor. These considerations become significant in the present apparatus both because of the heavy duty cutter bars and because of the increased harvester widths contemplated herein, viz., in excess of 16 feet. By the aforementioned mechanical driving or reciprocating means for the cutter bar assembly there is meant one in which the reciprocating cutter bar is connected by mechanical linkage to the pick-up assembly conveyor, in contradistinction to other types of drive means such as those actuated by hydraulic forces.

Preferably, mechanical linkage or other means are provided to maintain the cutter bar assembly in a position coplanar with the surface of the water, i.e., horizontal, as the pick-up assembly is raised and lowered to vary the cutting depth of the apparatus. Advantageously, the same linkage serves to rotate the cutter bar into a non-interferring position when the pick-up assembly is positioned to unload harvested payload. The simplest mechanical linkage consisting of one or more elongated members 118 (FIGS. 1 and 7) extending from the cutter bar assembly to support frame 13, and hingedly connected to each, will readily suffice.

GENERAL CHARACTERISTICS AND OPERATION OF THE HARVESTER

A representative aquatic harvester designed in accordance with the foregoing principles and embodying the various hereinabove delineated component systems is constructed utilizing four pontoon members 46 feet in length and having a diameter of 36 inches. The width of the deck, and hence of the entire harvester apparatus including the cutting swath is chosen as 16 feet. The harvester is powered by 391 cubic inch V-8 industrial engine adapted for propane fuel. A harvester of this size is readily capable of harvesting and carrying a payload of harvested aquatic material weighing at least 20,000 pounds. Even in its fully loaded condition the aquatic vehicle draws only approximately 15 inches of water. Moreover, because of this low draft, the powerful and efficient 360° rotatable air propulsion system, and the unique design of the pontoon members, it is impossible to strand the apparatus because of fouling with aquatic weed growth, and it is virtually impossible to run the apparatus aground, or upon some hidden obstacle such that it cannot be easily extricated solely by its own maneuvering power. Of course, larger or smaller versions of the present aquatic harvesting apparatus may be constructed in accordance with the principles set forth herein; however, there are no practical reasons dictating manufacture of a model of smaller proportions than the one described immediately above, since this model, including all of the advantageous features described above can still be manufactured and sold within a price range well below the prevailing minimum price of $30,000.00 currently associated with available harvesting machinery.

Operation of the present harvesting apparatus is basically very simple, and the entire harvesting and unloading operation can be easily supervised and carried out by a single operator. Thus, when preparing to commence harvesting, the operator activates the elevational control system for the pick-up assembly to lower the forward end thereof into the water to the desired cutting elevation. The pick-up assembly conveyor is then activated, which in turn initiates reciprocation or cutting motion of the cutter bar mechanism. Harvesting is now begun, and as the operator slowly propels the apparatus forward in the water, aquatic weed growth is continuously severed by the reciprocating cutter bars and conveyed up the incline of the pick-up assembly and ultimately deposited on the deck immediately beneath the aft portion of the pick-up assembly conveyor. As the harvested aquatic growth piles up at this point to a height of several feet, the operator intermittently engages the bed conveyor to gradually move the accumulated pile toward the rear of the deck. This operation is repeated until the bed conveyor is full.

With the apparatus now fully loaded, the forward end of the pick-up assembly is elevated to its uppermost position thereby bringing the aft end of the pick-up conveyor to a position contiguous with the bed conveyor. The harvesting apparatus in this configuration is now driven to an unloading location on the shore where a truck, wagon or other road vehicle is parked to receive the harvested weed growth. There the harvester is positioned so that the elevated pick-up assembly overhangs the side wall of the receiving vehicle. All that is now required for self-unloading of the harvester is that the operator activate the pick-up assembly conveyor in the forward direction and thereafter gradually advance the harvested payload in a forward direction along the bed conveyor. As a result, the harvested aquatic growth is transferred from the bed conveyor to the forwardly moving pick-up assembly conveyor, whereby it is then transported into the receiving vehicle. When very fine species of weed growth are being harvested, it may be necessary to install means such as the aforedescribed bed risers to assist in lifting the harvested weed growth from the bed conveyor to effect transfer thereof onto the pick-up assembly conveyor in its unloading position.

The embodiments of the invention in which an exclusive property or privilege is claimed are defined as follows:

1. An aquatic harvester comprising
    an aquatic craft having a plurality of pontoon members secured beneath a deck member, an above-the-water propulsion and steering system, means mounting the system on said craft,
    and a pick-up assembly on said craft for picking up aquatic material both at and below the surface of the water, each of said pontoon members comprising a unitary corrugated wall conduit of helically wound metal having folded and crimped seams along the spiral lines of construction.

2. An aquatic harvester according to claim 1, wherein said means is disposed and constructed so that said system is capable of rotating 360° about a vertical axis.

3. An aquatic harvester according to claim 2, wherein the air propulsion unit comprises an engine, an aerodynamic propeller and means for connecting the crankshaft of said engine to the propeller.

4. An aquatic harvester according to claim 3, wherein said connecting means comprises a flexible belt.

5. An aquatic harvester according to claim 3, wherein the mounting means for the air propulsion unit comprises a first horizontally disposed annular member secured adjacent the aft portion of the aquatic craft, a second annular member superimposed upon said first annular member, said second annular member being radially immovable with respect to said first annular member and circumferentially rotatable about a common vertical axis therewith, engine mounting means secured to said second annular member, and means to selectively rotate said second annular member through an arc of 360°.

6. An aquatic harvester according to claim 5, wherein said rotating means comprises a reversible electric motor operable from the ignition system of the propulsion unit engine.

7. An aquatic harvester according to claim 6, further comprising a remote control means for said electric motor.

8. An aquatic harvester according to claim 2, further comprising a bed conveyor means overlying the deck member, said conveyor means being selectively operable to convey in fore and aft directions.

9. An aquatic harvester according to claim 8, further comprising mounting means pivotally connecting the pick-up assembly to the aquatic craft so that said assembly projects forward of said craft and is rotatable about a horizontal axis, and actuating means for rotating said assembly to vary the elevation of the forward end of said assembly and to hold the assembly at selected elevations.

10. An aquatic harvester according to claim 9, further comprising spring-assist members for said actuating means.

11. An aquatic harvester according to claim 9, further comprising a pick-up assembly conveyor means which is operable to convey in both the fore and aft directions, whereby said pick-up assembly serves as an unloading means when the aft end of said pick-up assembly conveyor is rotated to a position contiguous with the bed conveyor means.

12. An aquatic harvester according to claim 11, further comprising selectively engageable means to assist elevation of harvested aquatic material from the bed conveyor means to the pick-up conveyor means when the latter is in the unloading position.

13. An aquatic harvester according to claim 12, wherein said elevation assisting means comprise a plurality of risers contained in the aquatic craft deck member.

14. An aquatic harvester according to claim 8, wherein said bed conveyor means comprises a plurality of laterally spaced endless conveyor chains, each having upstanding teeth at spaced intervals along its length.

15. An aquatic harvester according to claim 11, wherein said pick-up conveyor means comprises a plurality of laterally spaced endless conveyors having two laterally spaced conveyor chains connected at spaced intervals along their lengths by transverse bar members having at least a portion thereof extending upwardly from the plane defined by said conveyor chains.

16. An aquatic harvester according to claim 12, further comprising a three-phase electric power generator, and means to operably connect said generator to the crankshaft of the propulsion unit engine.

17. An aquatic harvester according to claim 16, wherein said connecting means comprises a means for converting variable input rotational speeds from the engine crankshaft into constant output rotational speed to the generator.

18. An aquatic harvester according to claim 16, wherein the pick-up conveyor means, bed conveyor means and actuating means for the pick-up assembly each additionally comprises a drive means comprising a reversible three-phase electric motor.

19. An aquatic harvester according to claim 18, further comprising means to transform a portion of the 3-phase output of said generator into three-phase power of reduced voltage, and remote control means for each of said drive means comprising a reduced voltage contactor operably connected through a control panel to said 3-phase reduced voltage power transforming means.

20. An aquatic harvester according to claim 11, further comprising a horizontal cutter means located adjacent the forward edge of the pick-up assembly.

21. An aquatic harvester according to claim 20, further comprising mechanical operating means for said cutter means, said operating means being driven by the pick-up conveyor means.

22. An aquatic harvester according to claim 20, wherein said cutter means comprises first and second cutter bars presenting a series of integral, spaced teeth, the teeth of the first bar being in overlying shearing cooperation with the teeth of the second bar, the teeth of both said first and second bars having blunt pointed tips with side portions rearwardly and outwardly diverging therefrom to an intermediate point, said side portions thereafter converging inwardly and rearwardly to a second intermediate point, and thence said side portions again diverging outwardly and rearwardly to the midpoint intermediate adjacent teeth, whereby the converging and second diverging side portions form a re-entrant configuration between adjacent teeth.

23. An aquatic harvester according to claim 22, wherein said second cutter bar is mounted stationary upon the pick-up assembly and said first cutter bar is divided into two equal sections, said harvester further comprising mechanical operating means, drivable from the pick-up conveyor means, for reciprocating said sections of the first cutter bar 180° out of phase with one another.

24. An aquatic harvester according to claim 22, wherein the first and second cutter bars are manufactured from a single rectangular sheet of metal with a single cutting operation, one cutter bar being the exact metal sheet residue resulting from the cut shape of the other cutter bar.

25. An aquatic harvester according to claim 24, wherein the cutter bars are constructed from metal stock having a thickness of at least about five-sixteenths inches.

26. An aquatic harvester according to claim 24, wherein the cutter bar teeth have edge portions comprising essentially flat surfaces extending essentially perpendicular to the plane of the cutter bar.

* * * * *